US010412594B2

(12) United States Patent
Bathula et al.

(10) Patent No.: US 10,412,594 B2
(45) Date of Patent: Sep. 10, 2019

(54) NETWORK PLANNING TOOL SUPPORT FOR 3D DATA

(71) Applicant: AT&T Intellectual Property I, L.P., Atlanta, GA (US)

(72) Inventors: Dinesh Bathula, Ballwin, MO (US); Nolan Black, Oakville, MO (US); Robert Cribb, Atlanta, GA (US); William Oswald, Carpentersville, IL (US); Stephen Pierson, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 598 days.

(21) Appl. No.: 14/448,601

(22) Filed: Jul. 31, 2014

(65) Prior Publication Data
US 2016/0037356 A1 Feb. 4, 2016

(51) Int. Cl.
H04W 16/18 (2009.01)
H04W 64/00 (2009.01)

(52) U.S. Cl.
CPC .......... *H04W 16/18* (2013.01); *H04W 64/003* (2013.01)

(58) Field of Classification Search
None
See application file for complete search history.

(56) References Cited

U.S. PATENT DOCUMENTS

| 7,133,551 B2 | 11/2006 | Chen et al. |
| 7,184,036 B2 | 2/2007 | Dimsdale et al. |
| 7,317,456 B1 * | 1/2008 | Lee .......... G06T 15/08 345/427 |
| 7,477,360 B2 * | 1/2009 | England .......... G06T 11/60 356/4.01 |
| 7,522,186 B2 | 4/2009 | Arpa et al. |
| 8,179,393 B2 * | 5/2012 | Minear .......... G06T 7/0024 345/642 |
| 8,208,715 B2 | 6/2012 | Lau et al. |

(Continued)

FOREIGN PATENT DOCUMENTS

JP 2007033157 A 2/2007

OTHER PUBLICATIONS

Fernandez et al., An Overview of Lidar Point Cloud Processing Software, GEM Center Report No. Rep_3007-12-001, Geosensing Engineering and Mapping (GEM) Civial and Coastal Engineering Department, University of Florida, Dec. 20, 2007, 27 pages.

(Continued)

*Primary Examiner* — Hamza N Algibhah
*Assistant Examiner* — Tony Williams
(74) *Attorney, Agent, or Firm* — Jackson Walker L.L.P.

(57) ABSTRACT

A telecommunication network planning method, system, and computer readable medium support accessing point cloud data and a corresponding image of a location. The point cloud data indicates positions of physical objects visible in the image. A network planning function may be performed. The network planning function may include modifying an outside plant asset object visible in the image, obtaining a metric of an outside plant asset object visible in the image, and adding a virtual outside plant asset to a location. The point cloud data may be associated with the image within an interface that depicts the image to facilitate visualization of the outside plant assets in the surrounding environment.

20 Claims, 10 Drawing Sheets

(56) References Cited

U.S. PATENT DOCUMENTS

| | | |
|---|---|---|
| 8,264,504 B2 | 9/2012 | Naimark |
| 8,284,190 B2 | 10/2012 | Muktinutalapati et al. |
| 8,515,669 B2 | 8/2013 | DeMaio et al. |
| 8,525,834 B2 | 9/2013 | Salemann |
| 8,649,632 B2 | 2/2014 | Neophytou et al. |
| 9,384,399 B2 * | 7/2016 | Bangay ............... G06K 9/00651 |
| 2002/0013837 A1 * | 1/2002 | Battat .................... G06F 3/0481 |
| | | 709/223 |
| 2007/0088709 A1 * | 4/2007 | Bailey ................. G06F 3/04815 |
| 2009/0323121 A1 * | 12/2009 | Valkenburg .......... G01B 11/002 |
| | | 358/1.18 |
| 2012/0105581 A1 | 5/2012 | Berestov et al. |
| 2012/0249544 A1 | 10/2012 | Maciocci et al. |
| 2013/0159862 A1 * | 6/2013 | Carr ........................ H04W 4/02 |
| | | 715/734 |
| 2013/0222369 A1 | 8/2013 | Huston et al. |
| 2013/0228620 A1 * | 9/2013 | Ahern .................. G01C 15/002 |
| | | 235/439 |
| 2013/0300740 A1 | 11/2013 | Snyder et al. |
| 2014/0002439 A1 | 1/2014 | Lynch |
| 2014/0002440 A1 | 1/2014 | Lynch |
| 2014/0141788 A1 * | 5/2014 | Puthenpura ........... H04W 16/18 |
| | | 455/449 |

OTHER PUBLICATIONS

Haala, et al., Mobile Lidar Mapping for 3D Point Cloud Collection in Urban Areas—A Performance Test, Institute for Photogrammetry, Universitaet Stuttgart, Germany, 6 pages.

Harrap, et al., An Overview of LIDAR for Urban Applications, Queen's University, 2006, 9 pages.

* cited by examiner

NETWORK PLANNING TOOL SUPPORT FOR 3D DATA

BACKGROUND

Field of the Disclosure

Disclosed subject matter is in the field of telecommunication networks and more specifically, network planning tools for telecommunications networks.

Description of the Related Art

In the field of telecommunications, network planning tools enable network administrators, engineers, technicians, and others to manage the placement and configuration of telecommunication assets, also sometimes referred to as outside plant assets (outside plant assets) or simply outside plant. Historically, network planning tools have provided a two dimensional (2D) context and leveraged 2D data such as geographic information service (GIS) data to map outside plant assets in a 2D domain, e.g., latitude and longitude or street address. Various features and applications have been developed to facilitate network planning within the historical 2D context. Constrained to two dimensions, however, conventional network planning tools are limited in their ability to provide a user with a meaningful "view" of existing and proposed outside plant assets in their actual environments.

BRIEF DESCRIPTION OF THE DRAWINGS

A network planning tool disclosed herein provides a planning environment in which three dimensional (3D) data objects defined by highly accurate 3D position coordinates are synchronized with a visually rich image of a location in conjunction with traditional network planning tool features and 3D extensions of those features for managing existing and proposed outside plant assets. In some embodiments, a 3D network planning tool may generate, obtain, or otherwise access highly accurate point cloud data, produced by light-based radar (LIDAR) or another suitable imaging technology, indicating 3D coordinates of points on the surfaces of objects at the location. This raw point cloud data may be post-processed to identify point cloud objects corresponding to distinct physical objects at the location. The point cloud objects are associated with a high resolution image of the location to facilitate a variety of network planning functions and features including, as examples, visualizing existing and proposed installations of various network elements, measuring and taking other metrics of outside plant assets at a remote location, and visualizing a secondary point cloud representing, for example, a small cell generated by an antenna or transmitter.

In addition to enabling network planners, administrators, engineers, field technicians, and others to visualize existing and proposed installations of outside plant assets in three dimensional space juxtaposed with an actual image of the adjacent environment, objects representing virtual and existing outside plant assets may be tagged and assigned attributes that facilitate group reports indicating the location of various existing and proposed outside plant assets.

DESCRIPTION OF EMBODIMENTS

Figure 1:
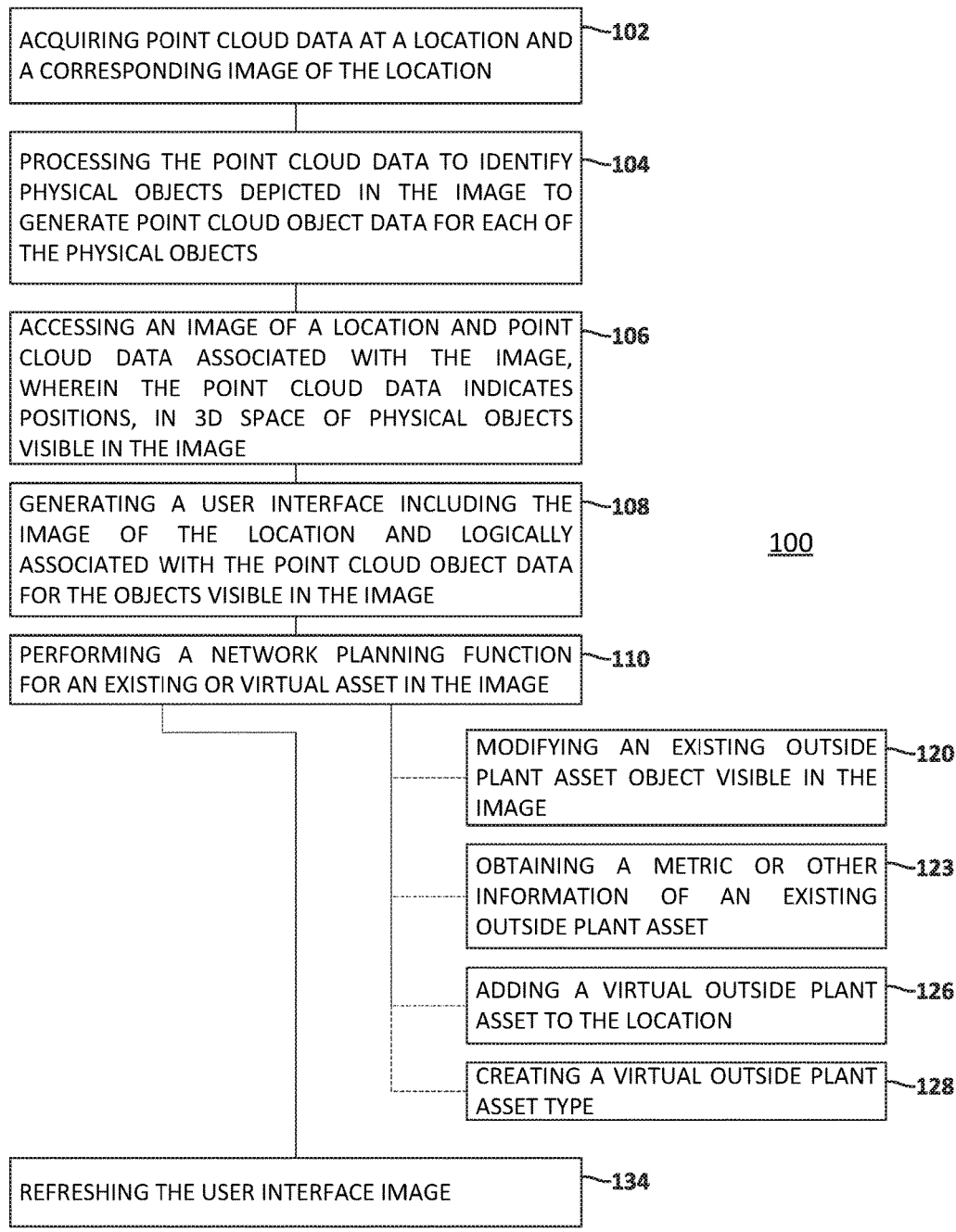
FIG. 1 illustrates elements of a network planning method.

Embodiments of subject matter disclosed herein include embodiments directed to a network planning method that includes accessing an image of a location and point cloud data associated with the image. The point cloud data may include a plurality of n-tuples, each n-tuple associated with a corresponding point in the image and each n-tuple indicating a three dimensional position of an object located at the point. The three dimensional position may be indicated in a rectangular coordinate system, including X, Y, and Z coordinates, or in another coordinate system such as a spherical coordinate system in which points are identified with two angles and a displacement, or in any other suitable coordinate system. The method may further include performing a network planning function. Network planning functions may include, as non-limiting examples, identifying and depicting existing outside plant assets at the location, modifying an existing outside plant asset object visible in the image, obtaining a metric of an outside plant asset object visible in the image, and adding a virtual outside plant asset to the location. The point cloud data may include post-processed point cloud data including a plurality of point cloud objects, each point cloud object representing a physical object depicted in the image.

Accessing the image of the location may include selecting a streetview icon from a map interface or another type of 2D representation of the location or a geographic region that includes the location. The streetview user interface may be provided as a pop up window overlying the map interface. The map interface may include functionality to selectively display existing outside plant assets located within the application geographic region. The method may include assigning one or more attributes to one or more outside plant assets included in the user interface and functionality for generating asset reports, which may be filtered in accordance with one or more of the assigned attributes. In embodiments applicable to telecommunications networks, outside plant assets may include, as non-limiting examples: metrocell transmitters, utility poles, communication cables, switch boxes, and so forth.

In some embodiments, existing outside plant assets of a first type and virtual assets of the first type may be differentiated by color or another visible characteristic. Similarly, two different types of assets may be indicated by two different types of icons, colors, or other suitable characteristics.

In some cases, an outside plant asset may be associated with a primary point cloud, representing the asset itself, and a secondary point cloud indicative of a characteristic of the outside plant asset. In the case of a metrocell transmitter, as an example, the transmitter may be associated with a primary point cloud indicating the location of the transmitter and a secondary point cloud indicative of coverage provided by the metrocell transmitter.

The point cloud data for an entity's outside plant assets may be stored and subsequently accessed for application to a second image of the location. The second image of the location may have been created after the point cloud data. Following a natural disaster, for example, an image of the location may be employed in conjunction with the archived point cloud data to perform preliminary assessment of damages. In addition, the point cloud data may be suitable for use in the event that an image of a location is rendered in a format that differs from the original image of the location.

In some embodiments, obtaining a metric of an outside plant asset includes measuring a linear dimension of an outside plant asset, measuring an area of a surface of an outside plant asset, measuring an orientation angle of an outside plant asset, and the like.

Other embodiments may include computers and other system, which may include image capture and image processing devices including lasers, cameras, and the like to acquire or access raw point cloud data and one or more images for a location, and hardware and software to perform post processing of the raw point cloud data to identify objects in the image and associate the objects with corresponding point cloud data objects.

Referring to FIG. 1, selected elements of a network planning method 100 are illustrated. The network planning method illustrated in FIG. 1 includes acquiring (block 102) raw point cloud data and at least one image of a geographical location. In at least one embodiment, raw point cloud data includes a set of 3D space coordinates indicative of or otherwise associated with physical objects present at the location. The point cloud data may be generated using LIDAR or another suitable 3D imaging technology. In some embodiments, the point cloud data includes highly accurate X, Y, and Z coordinates corresponding to points on the surfaces of the applicable objects. In the case of LIDAR generated point cloud data, each point cloud data point may be assigned by determining the distance between the source of the laser and a corresponding point on the surface of an object, which can be determined based on the time required to receive a reflected signal back from the surface point. Given the position of the laser source and the direction of the laser, the raw point cloud data points can be resolved in three dimensions based on the calculated distance.

The point cloud data acquired in (block 102) may be referred to as raw point cloud data because the data points are not associated with any physical particular object. Instead, the raw point cloud data may include, as an example, a data point representing a point on the surface of a first structure adjacent to a data point corresponding to a point on the surface of a second structure. In the embodiment of method 100 illustrated in FIG. 1, the raw point cloud data is post processed (block 104) to identify individual physical objects present at the location. Post processing of point cloud data may be performed according to any of a variety of point cloud processing algorithms beyond the scope of this disclosure. See, e.g., Euclideon, a 3D graphics engine which makes use of a point cloud search algorithm to render images, MeshLab, an open source tool for managing point clouds and converting them into 3D triangular meshes, CloudCompare, an open source tool for viewing, editing and processing high density 3D point clouds, PCL (Point Cloud Library), a comprehensive BSD open source library for n-D Point Clouds and 3D geometry processing, and TAMU 3D Point Cloud Editor, a GUI application developed at Texas A&M University for interactively editing and visualizing point clouds stored in various file formats.

In at least one embodiment, post processing of raw point cloud data organizes the data points into groups where each group represents an individual object. Data points may be grouped based on proximity and other factors. The set of data points corresponding to a single physical object may be referred to herein as point cloud object data. Point cloud object data indicates the shape and 3D position of the surface of the applicable object.

In at least one embodiment, post processing of the raw point cloud data generates point cloud object data corresponding to each of the distinct physical objects in the image. In some embodiments, the acquisition of raw point cloud data in block 102 and the post processing of raw point cloud data in block 104 may each be performed by an entity that is different than an entity that uses the post processed data in conjunction with a specific application.

The method 100 illustrated in FIG. 1 includes accessing (block 106) point cloud object data and a corresponding image of a location. The point cloud object data includes 3D position data corresponding to a plurality of physical objects visible in the image. The image may include outdoor plant assets of a telecommunication provider or network, and outdoor plant assets of a competitor telecommunication service provider, as well as non-assets, i.e., physical objects not part of a telecommunications network.

In some embodiments, attributes may be assigned to individual objects associated with each point cloud object. Attributes may be used to differentiate the assets of a telecommunications service provider from like or similar assets of a competitor and from non-asset objects including, as examples, buildings, streets, vehicles, and so forth. The point cloud data corresponding to a service provider's assets may be extracted from and recorded or otherwise preserved apart from the remainder of the data. In at least one such embodiment, the service provider may then re-use the point cloud data for its assets apart from the original image and the set of point cloud objects. If, for example, a subsequent image of the location is generated, the service provider may apply the point cloud object data for its assets to the new image. If the new image differs substantially from the original image such as following a natural disaster, an initial assessment of the impact to the provider's assets may be obtained.

The network planning method 100 illustrated in FIG. 1 includes generating (block 108) a user interface that includes the image of the location and is associated with the point cloud object data corresponding to objects depicted in the image. As an example of the association between the image and the point cloud data objects, the user interface may display the image and, when a cursor is moved over the image, the cursor may indicate the presence of point cloud data underlying the image or with a specific object visible in the image. For example, the cursor could, in some embodiments, depict a cloud-like icon that approximately corresponds in size and shape to the applicable point cloud data object. In other embodiments, the cursor may simply change in appearance to indicate to the user that point cloud data is associated with the image or a portion of the image over which the cursor is currently located. In at least one embodiment, the user interface referenced in block 108 is accessed as a value added feature or extension of an existing or legacy network planning tool to provide support for 3D extensions of the feature.

In at least one embodiment, a network planning tool generates a 2D interface depicting a street map or another other suitable two dimensional representation of a portion of a location. The 2D interface may include, emphasize, or otherwise depict existing outdoor plant assets located within the region encompassed by the map. In at least some embodiments, the 2D interface may include selectable elements enabling the user to show or hide various types of assets.

The 2D interface may include a tab, menu item, icon or another element for accessing 3D features. The user who wishes to access 3D features may click on the 3D extension element and, in at least one embodiment, the network planning tool will display an image of the applicable location and identify or access point cloud object data corresponding to the location depicted in the image. The 3D interface may appear as a pop-up window or otherwise external to or apart from the traditional network planning tool or, in other embodiments, the 3D user interface may appear as a window in the network planning tool, either replacing or in addition to the original window. Although block 108 is illustrated in FIG. 1 as an operation of method 100, other embodiments may omit the actual generation of the user interface and, instead, provide the user interface and the associated point cloud object data to an external network planning application.

The network planning method 100 illustrated in FIG. 1 further includes performing, (block 110) a network planning function for either an existing outside plant asset or a virtual outside plant asset. Virtual outside plant assets may represent proposed or future assets being considered for inclusion within the network at the indicated location. The existing outside plant assets may include outside plant assets of the service provider as well as outside plant assets of a competitor service provider.

In at least one embodiment, the network planning functions that may be performed in conjunction with the 3D interface include a function for modifying (block 120) an existing outside plant asset object that is visible in the image. In at least one embodiment, modifying an existing outside plant asset object may include modifying a position or location of an existing outside plant asset, modifying a configuration of an existing outside plant asset, or supplementing an existing outside plant asset with point cloud data or 3D features. As an example of supplementing an asset with point cloud data, the network planning tool may have access to a legacy database of outside plant assets generally represented in two dimensions. In these embodiments, supplementing an existing outside plant asset may include generating more accurate 2D data as well as adding a third dimension to the existing outside plant asset. For example, a cellular telephone tower or other type of antenna or transmitter may be indicated in a 2D network planning database with X and Y coordinates. In these embodiments, the antenna may be visible in an image of the applicable location and the point cloud data generated in conjunction with the image may provide, in addition to the X and Y coordinates of the antenna, a Z coordinate indicating the elevation or height of the antenna.

The network planning functions illustrated in FIG. 1 also include a function for measuring or otherwise obtaining (block 123) a metric or other data pertaining to an existing or virtual outside plant asset. As an example, in at least one embodiment, the network planning tool may present an image that includes a piece of existing outside plant asset such as a utility pole. The network planning tool may include conventional control elements for zooming, panning, and selecting portions of an image. In these embodiments, the network planning tool may permit the operator to zoom into an existing outside plant asset for purposes of obtaining one or more measurements or metrics associated with the asset. In the case of a utility pole, for example, at least one embodiment of the network planning tool includes a measurement feature that enables a user to measure one or more dimensions of an outside plant asset depicted in the image of a location. The user interface may include a control element such as, for example, a selectable button depicting an image of a ruler or other measurement device as a means for invoking the measurement feature. After a user zooms, pans, or otherwise trains or focuses the 3D interface on a desired object, the user may select the measurement icon or control element to invoke the measurement feature. In at least some embodiments, the cursor may change in appearance to acknowledge that the network planning tool has transitioned to a feature measurement mode. The operator of the network planning tool may then click on the measurement tool and, using a mouse or other suitable input device, trace the asset of interest. As the user moves the cursor over the image and then over the particular outdoor plant asset, the network planning tool may identify point cloud data corresponding to the beginning point and ending point of the trace made by the user over the applicable object. From the point cloud data, the network planning tool may calculate the distance between the end point and the beginning point. Using this feature, a user may measure the utility pole or characteristics of the utility pole from a remote location, thereby beneficially saving the time and energy required to send a field representative to the location of the utility pole, especially if the utility pole is located in a rural or remote area. With this feature, for example, the network planning tool may enable a user to measure the length of a utility pole or the distance between two assets attached to a utility pole. For example, the user may invoke the network planning tool to determine a distance between a cable box and a transformer attached to the utility pole.

In still another example, the measurement tool may support a feature in which an orientation or angle of an outdoor plant asset is determined. For example, using substantially the same procedure used to measure dimensions of an outdoor plant asset, a user may trace a line or other shape between two points of an outdoor plant asset and then invoke an angle or orientation feature of the measurement interface to determine the orientation, angle, or slope of an existing asset. For example, this feature might be employed to determine the slope of a telephone wire or another suitable wire or cable extending from a utility pole. Although the measurement tool is described herein using a utility pole as the asset, the tool is equally applicable to other types of assets.

In addition to modifying existing outside plant assets and measuring or obtaining metrics pertaining to an existing outside plant asset, the network planning functions represented by reference 110 include adding (block 126) a virtual outside plant asset to a location. The network planning tool may have access to one or more previously designed and supported 3D objects that may be used to generate planning scenarios by adding proposed elements to a location and then visually reviewing an image of the location revised to include the proposed asset. In at least one embodiment, the types of outside plant assets available to a user include a library of pre-existing asset types and may further include user-defined asset types.

Although not strictly required, the embodiment of method 100 illustrated in FIG. 1 includes creating (block 128) a virtual outside plant asset type. In an embodiment supporting a virtual asset creation feature, a user may generate a virtual outside plant asset type by effectively copying the point cloud object data corresponding to point cloud object data for an existing asset. For example, a virtual utility pole type may be created, if one were not available in a virtual object library, by copying point cloud object data associated with an existing utility pole. The point cloud object data for a virtual asset type may modify the data copied from the existing outside plant asset. For example, the point cloud object data for an existing utility pole may include data identifying the location as well as the shape of the utility pole. However, when creating a virtual asset type, it is desirable to remove any data corresponding to a particular location, thereby leaving behind point cloud object data identifying just the shape of the outside plant asset. In this manner, new instances of virtual outside plant assets may be provided to a location and the network planning tool may simply translate the point cloud object data for the virtual asset type in accordance with the position and orientation selected by the user.

In at least one embodiment, outside planning assets are represented by point cloud object data supplemented with attribute data that may include, as non-limiting examples, a tag or field to indicate whether the asset is existing or proposed, a tag or field to indicate an owner or operator of the asset, and one or more configuration settings that may influence the performance of a proposed or existing asset. The types of assets that may be employed within a network planning tool may include conventional network planning assets such as fiber cables, local network service (LNS) cables, VRADs, LUs, and other suitable telecommunication network assets.

In at least one embodiment, a virtual outside plant asset associated with point cloud object data may generate or otherwise be associated with a secondary point cloud representing coverage or other another attribute associated with the asset. In at least one embodiment, a virtual outside plant asset includes a transmitter or antenna configured to provide a metrocell, small cell, or another suitable hotspot. In these embodiments, the outside plant asset may include point cloud object data representing the physical structure of the outside plant asset as well as a coverage point cloud indicating the extent of the hotspot or other network characteristic generated by the virtual outside plant asset. In at least one such environment, the virtual outside plant asset may further include configuration settings that influence the behavior or structure of the secondary point cloud. In the case of a metrocell antenna, the outside plant asset may include a configuration setting for an orientation of an antenna or another feature that may influence the resulting secondary point cloud. In at least one embodiment, the network planning tool may generate a visual representation of the secondary point cloud generated by the corresponding outside plant asset to enable the user to visualize, not only the placement of the antenna, but also the resulting coverage. The secondary point cloud may be determined and/or influenced by factors such as the location, orientation, and composition of adjacent structures. The embodiment of method 100 illustrated in FIG. 1 includes a refresh operation (block 134) that is performed after each network planning function is performed.

Figure 2:
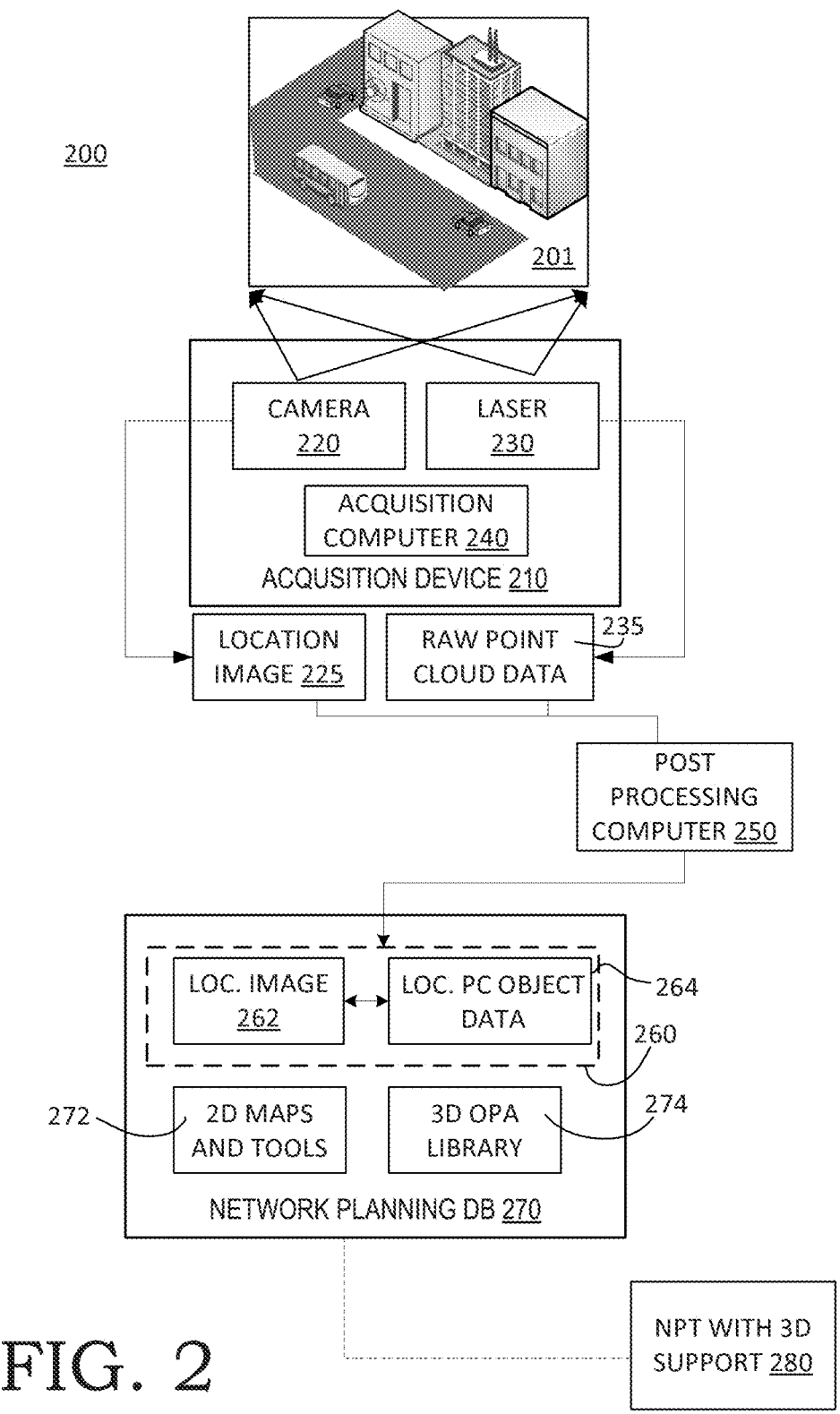
FIG. 2 illustrates elements of a network planning platform.

Referring now to FIG. 2, a network planning platform 200 suitable for supporting point cloud data and performing the method 100 illustrated in FIG. 1 is disclosed. The network planning platform 200 depicted in FIG. 2 includes an acquisition device 210 that includes a camera 220 and a laser 230 coupled to an acquisition computer 240. Acquisition device 210 may be stationary or, in other embodiments, affixed to a movable platform such as an automobile or other motor vehicle. Camera 220 and laser 230 generate data corresponding to a location 201. In at least one embodiment, camera 220 takes one or more pictures of location 201 to create location image 225. Location image 225 comprises data corresponding to one or more images of location 201. Laser 230 is configured to scan the location 201 and to generate raw point cloud data 235 by any suitable mechanism including the mechanisms described with respect to FIG. 1. Acquisition computer 240 is configured to operate camera 220 and laser 230 in synchronicity such that the raw point cloud data 235 generated by laser 230 can be mapped or otherwise associated with the location image 225 generated by camera 220. Acquisition computer 240 may also control operation of camera 220, laser 230, or both.

In at least one embodiment, raw point cloud data 235 includes a large number of data points where each data point includes, at least, 3D coordinate information indicating, in 3D space, the location of a point of location 201. Acquisition computer 240 may operate in conjunction with laser 230 to assign 3D position data to each pulse of laser 230. Generally, the 3D position data may be determined based upon the location of the laser, the orientation of the laser, and the distance traveled by the laser and back to the laser after reflecting off of an object within location 201.

The raw point cloud data 235 may be associated with location image 225 by assigning or otherwise generating a relationship between each piece of raw point cloud data and a pixel or other sub element of location image 225. Illustrating the association between location image 225 and raw point cloud data 235, at least one embodiment may associate each piece of location information included in the raw point cloud data 235 with a pixel or other sub element of location image 225. More generally however, the association between location image 225 and raw point cloud data 235 assigns X and Y image coordinates, corresponding to specific XY coordinates within the two dimensional image 225, to each piece of raw point cloud data 235 corresponding to location 201.

Network planning platform 200 includes post processing computer 250 that accesses or otherwise retrieves location image 225 and raw point cloud data 235. Post processing computer 250 is configured with hardware, software, or both to identify distinct physical objects depicted in location image 225. Post processing computer 250 may identify objects depicted in location image 225 and represented in raw point cloud data 235 by a proximity-based algorithm in which two points that are located in close proximity to one another according to their XYZ data are assumed to be of the same physical object. Post processing of 3D imaging information is known to those of skill in the field of three-dimensional graphics and three-dimensional video and is beyond the scope of this disclosure.

In the embodiment of platform 200 illustrated in FIG. 2, post processing computer 250 generates network planning data 260 including location image 262 and point cloud object data 264. FIG. 2 illustrates and emphasizes that, in the depicted embodiments, location image 262 is associated with point cloud object data 264. Point cloud object data 264 represents the data generated by post processing computer 250 based on raw point cloud data 235.

Network planning platform 200 as illustrated in FIG. 2 further includes a network planning tool 280 that includes support for 3D representations of physical objects such as the physical objects depicted in an image of a location of interest. The network planning tool 280 may be implemented as a computer system that includes a processor, memory, a display device and I/O devices such as keyboards, point devices, and the like for receiving user input. The memory may be implemented with volatile memory devices, non-volatile memory devices, or both. Processor executable program instructions may be stored in the memory of network planning tool 280. When executed by the processor, the program instructions may cause the processor to perform any of the network planning methods described herein. The network planning tool 280 depicted in FIG. 2 may have access to a network planning database 270 that includes a library 272 of legacy maps and network planning tools, typically conveying or supporting two dimensional data as well as a 3D outside planning asset library 284, which may include point cloud data for one or more virtual object types.

Referring now to FIG. 3 through FIG. 17, exemplary user interfaces are illustrated to emphasize functionality of a network planning tool that includes three-dimensional support. The user interfaces illustrated in FIG. 3 through FIG. 17 emphasize the use of a 3D tool in conjunction with a traditional network planning application that employs, for example, a geographic information systems (GIS). Although the various features illustrated herein emphasize 3D support for and extensions of a GIS based planning tool, the 3D features illustrated herein may be implemented in a stand-alone application.

Figure 3:
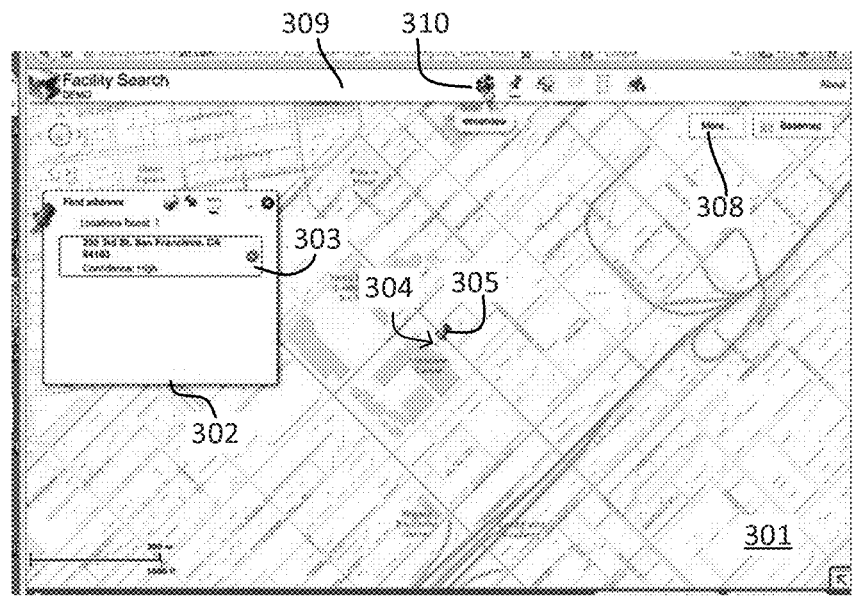
FIG. 3 illustrates a user interface of a network planning tool depicting a map of a geographic area that includes a location selected by a user.

Referring to FIG. 3, user interface 300 represents one type of user interface a network planner may interact with during a network planning session. User interface 300 may include features similar to features included in conventional two dimensional GIS mapping tools that will be familiar to those of skill in the art. As depicted in FIG. 3, user interface 300 includes a GIS map 301 and emphasizes a feature for finding or locating a particular address. As illustrated in FIG. 3, a find address feature displays a pop-up window 302 and includes a window 303 in which a user may enter a desired address. The user interface 300 illustrated in FIG. 3 displays a pushpin 305 on GIS map 301 to indicate a location 304 corresponding to the address entered by the user in window 303.

The GIS map 301 of user interface 300 includes an additional features icon 308 for overlaying or otherwise displaying additional information including, as a non-limiting example, information indicating the type and/or position of various types of outside plant assets of a service provider.

The user interface 300 illustrated in FIG. 3 includes a toolbar 309 containing icons for various tools accessible from user interface 300. As illustrated in FIG. 3, toolbar 309 includes, in addition to other elements, a streetview icon 310 that provides support for 3D features and extensions. As depicted in FIG. 3, a user has entered an address in window 303 and the planning tool, which may include features of or access to a GIS application, displays GIS map 301 or another 2D representation of an area that includes the address entered by the user.

Figure 4:
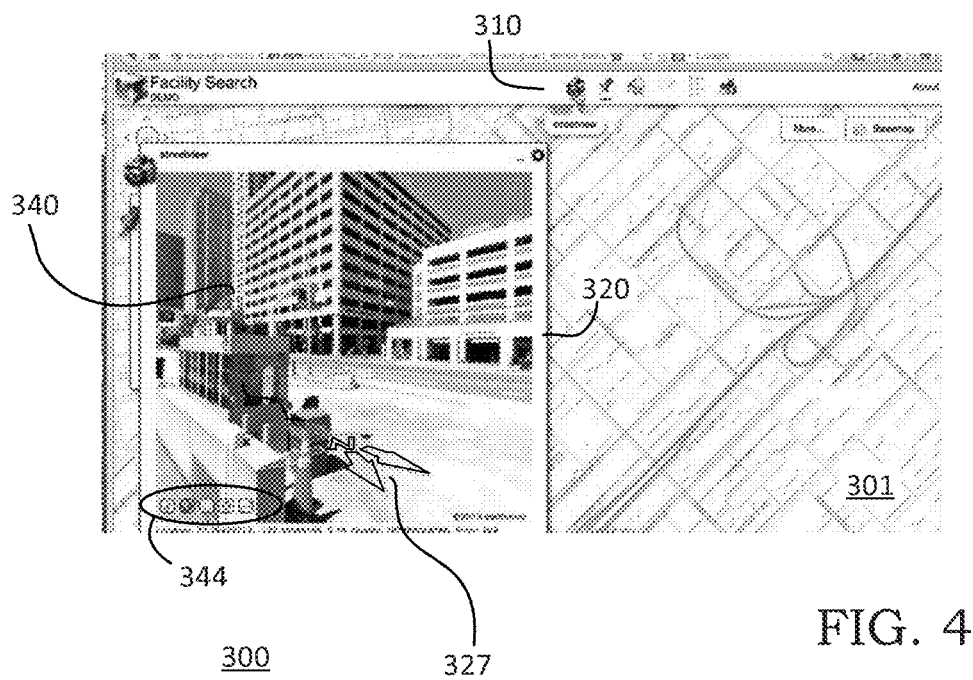
FIG. 4 illustrates a streetview image of the location of FIG. 3.

FIG. 4 illustrates the selection of streetview icon 310 from the user interface 300 of FIG. 3. As depicted in FIG. 4, user selection of streetview icon 310 generates a pop-up window 320 that includes an image 340 of location 304 (FIG. 3). In some embodiments, an azimuth (not visible in the figures) or another suitable indicator of direction is appended to the pushpin 340 in GIS map 301 when pop up window 320 is displayed. In these embodiments, the azimuth indicates, on GIS map 301, the direction of view corresponding to the image 340. In at least one embodiment, pop up window 320 includes, in addition to the image 340 of location 304, point cloud object data associated with image 340. Although the point cloud data underlying image 340 is not itself visible in pop-up window 320, some embodiments may indicate the presence of point cloud data and the association between the point cloud data and the image 340 by altering the appearance of a cursor when the cursor is positioned over an image 340 or a portion of image 340 with which point cloud data is associated. The pop-up window 320 of FIG. 4 further includes various functionality controls 344 for performing one or more point cloud supported network planning functions. FIG. 4 also illustrates a directional indicator 327 overlaying or incorporated into image 340. The directional indicator 327 may represent an optional or user selectable feature that is generated within three-dimensional support pop-up window 320 when applicable.

Figure 5:
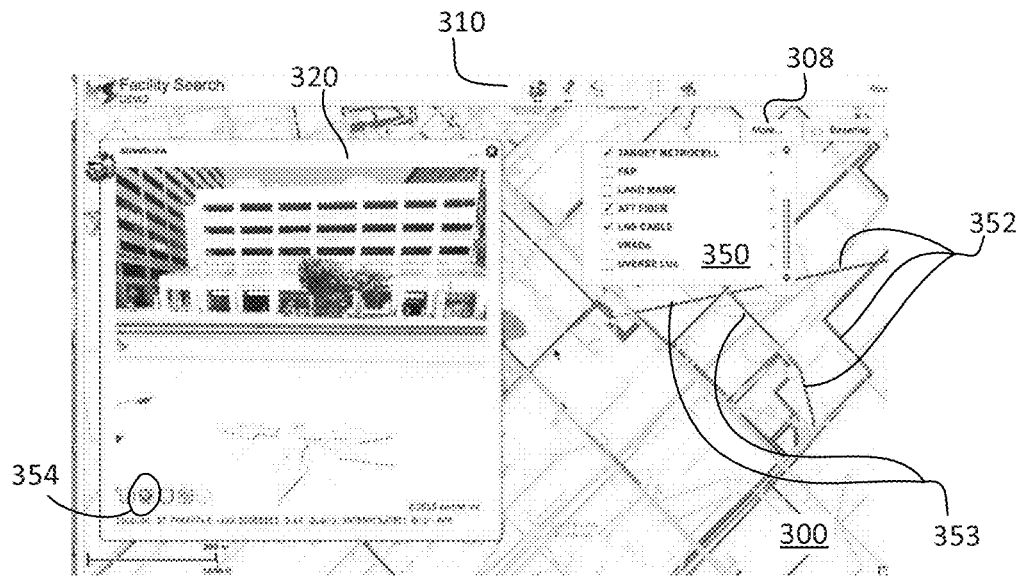
FIG. 5 illustrates a feature for indicating outside plant assets in the map of FIG. 3.

FIG. 5 depicts user interface 300 after assertion of additional information icon 308. In the embodiment illustrated in FIG. 5, assertion of additional information icon 308 generates an additional information drop-down list 350 including a plurality of selectable elements. The elements selected for inclusion in the user interface 300 include a target metrocell, AT&T fibers, and an LNS cable. With the selection of each of these types of assets, user interface 300 incorporates visibly detectable elements representing the locations of corresponding types of outdoor plant assets. The AT&T fibers selected in drop-down list 350, for example, may be illustrated as colored lines 352 of a first color while the LNS cables selected in drop down list 350 are illustrated as colored lines 353 of a second color in GIS map 301 of user interface 300.

Figure 6:
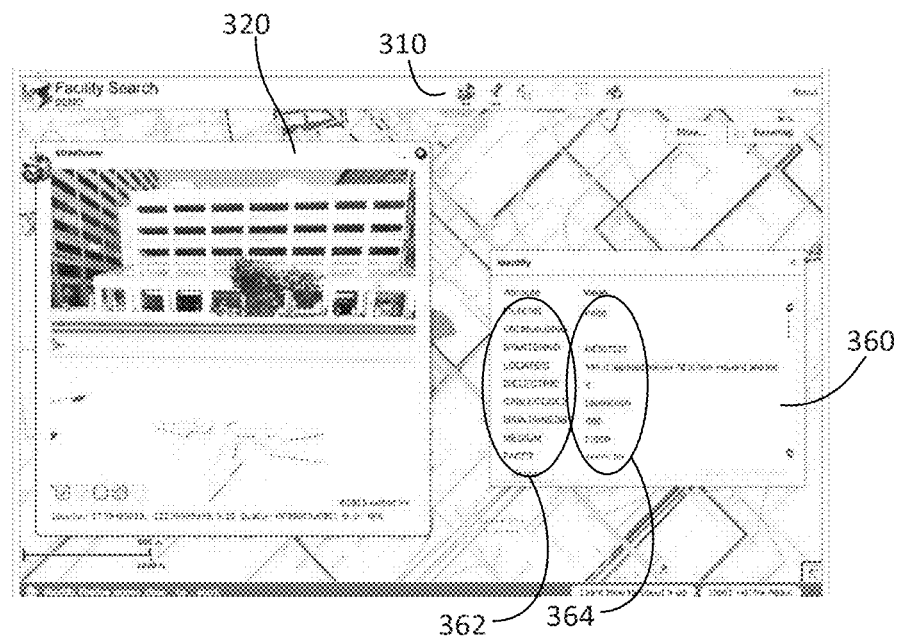
FIG. 6 illustrates a feature for displaying attributes of a selected outside plant asset.

The three-dimensional pop-up window 320 illustrated in FIG. 5 includes an identify icon 354 that enables the user to obtain information regarding various outdoor plant assets represented in the GIS map 300 of FIG. 5. Referring to FIG. 6, assertion of identify icon 354 generates an identification window 360. The illustrated identification window 360 displays various attributes 362 and corresponding values 364 of an outside plant asset displayed in GIS map 301 and selected by the user. The identification window illustrated in FIG. 6 is representative of an identification window suitable for telecommunication fiber assets, but it will be readily appreciated that each type of outside plant asset may have its own corresponding information window 360.

Figure 7:
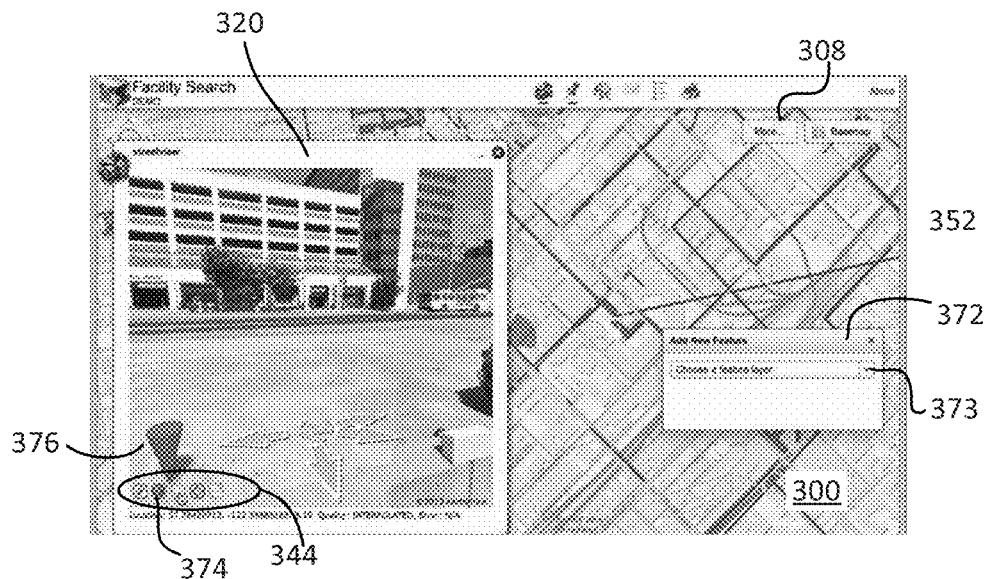
FIG. 7 illustrates a feature for interacting with point cloud data associated with an image of the location.

Referring now to FIG. 7, an add new feature function corresponding to an add new feature icon 374 in functionality controls 344 within three dimensional support pop-up window 320 is shown. The user interface 300 illustrated in FIG. 7 includes a point cloud data icon 376. In at least one embodiment, point cloud data icon 376 appears whenever the cursor is located overlying an image 340 with which point cloud data has been associated. In any such embodiments, the presence of a point cloud icon 376 conveys to the user that the location depicted in image 340 has been scanned with a laser and that the resulting point cloud data has been processed and associated with the image 340 of location 304. In the user interface 300 illustrated in FIG. 7, an add new feature window 372 pops up in response to assertion of add new feature icon 374. The add new feature window 372 includes a drop down list 373 listing at least a portion of the types of assets a user may add.

Figure 8:
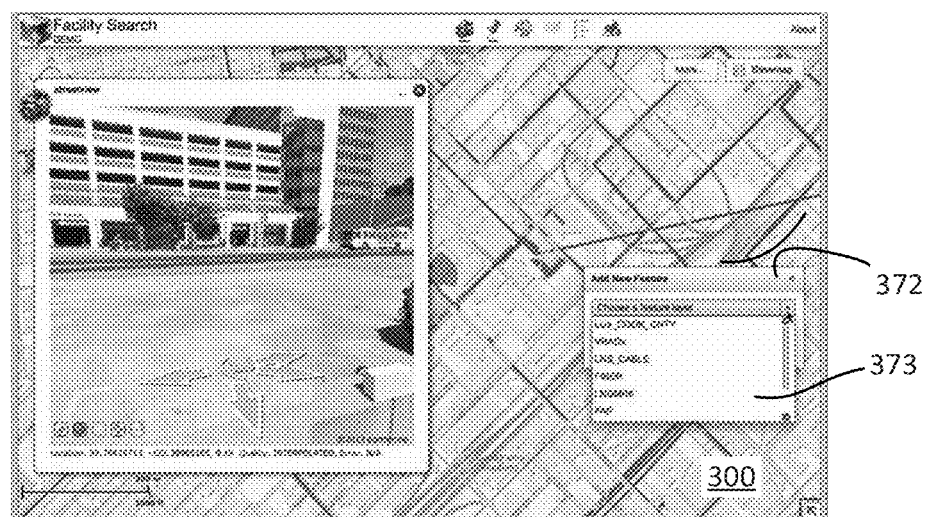
FIG. 8 illustrates a feature for adding an outside plant asset to the location depicted in the image.
Figure 9:
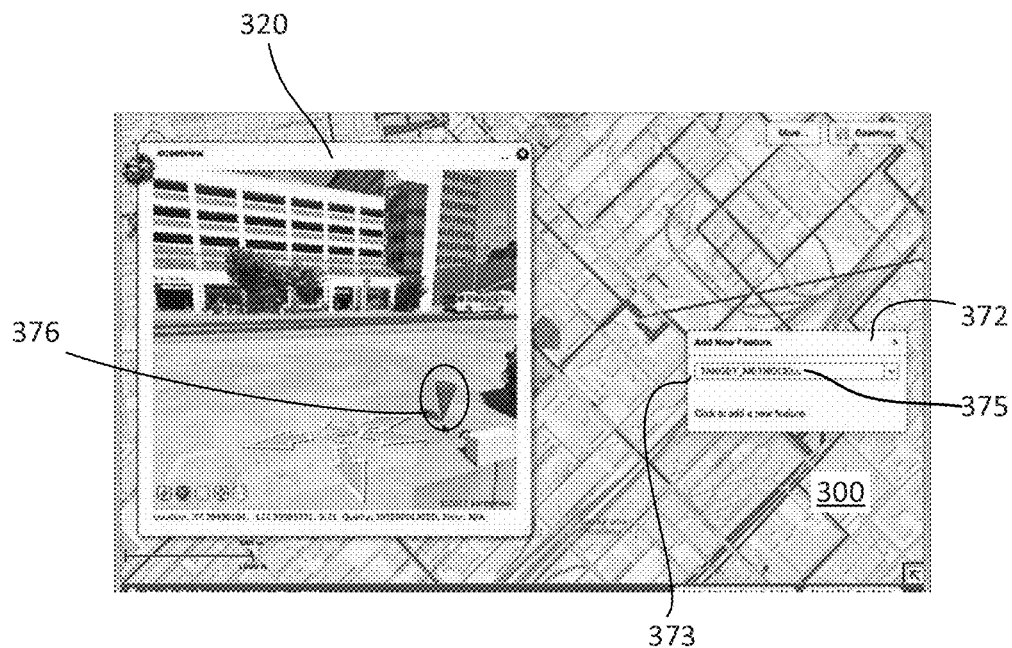
FIG. 9 illustrates a feature for adding a metrocell to a selected location.

In FIG. 8, the drop-down list 373 associated with add new feature window 372 is expanded to indicate a number of features or assets that may be added. The user may select any of the elements listed in drop-down list 373. In FIG. 9, the user has selected the target metrocell item 375 from drop down list 373 as the feature to be added. FIG. 9 also illustrates the user repositioning the point cloud icon 376 to a position within pop-up window 320 where the user would like to add the identified asset, which is a metrocell in the illustrated example.

Figure 10:
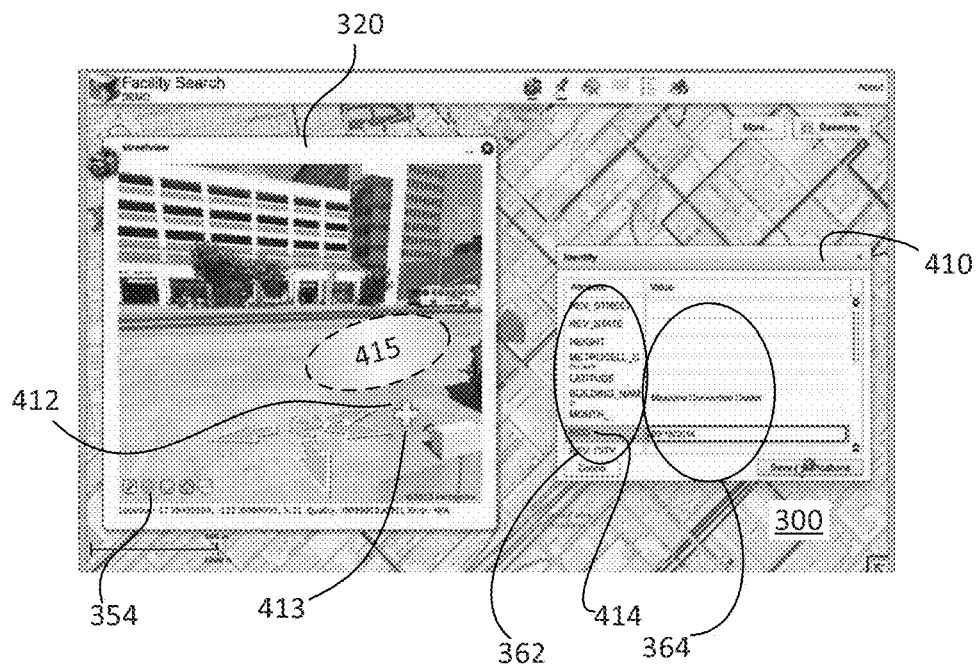
FIG. 10 illustrates features for indicating a proposed metrocell, a corresponding secondary point cloud indicating coverage provided by the metrocell, and attributes of the metrocell.

Referring now to FIG. 10, user interface 300 as shown illustrates the addition of a proposed metrocell asset, denoted by metrocell icon 412, at location 413 in pop window 320. The user may select the newly added metrocell icon 412 and view or edit identification information associated with the proposed asset by selecting identification icon 354 to display identification window 410. Identification window 410 displays attributes 362 and their corresponding values 364, if any. The user enters additional identification information into the identification window 410. The user may enter information including, as one non-limiting example illustrated in FIG. 10, information pertaining to an estimated completion data attribute 414. This feature emphasizes the ability for a user to indicate to others that the asset is not currently online while at the same time indicating an expected date at which time the asset will hopefully become usable.

FIG. 10 illustrates a secondary point cloud 415 associated with metrocell icon 412. The secondary point cloud 415 for a metrocell asset indicates, in at least one embodiment, a projected region of wireless coverage provided by the applicable metrocell 412. The secondary point cloud may be determined based on one or more attributes of metrocell 412 as well as the presence and attributes of objects located in proximity to metrocell 412. Metrocell 412 may include one or more attributes that impact the location and/or size of secondary point cloud 415. For example, metrocell 412 may include an antenna orientation attribute and a transmission power attribute that impact the location and size of secondary point cloud 415. In some embodiments, secondary point cloud 415 is tightly bound to metrocell 412 such that, for example, a representation of metrocell 412 inherently depicts the secondary point cloud 415.

Figure 11:
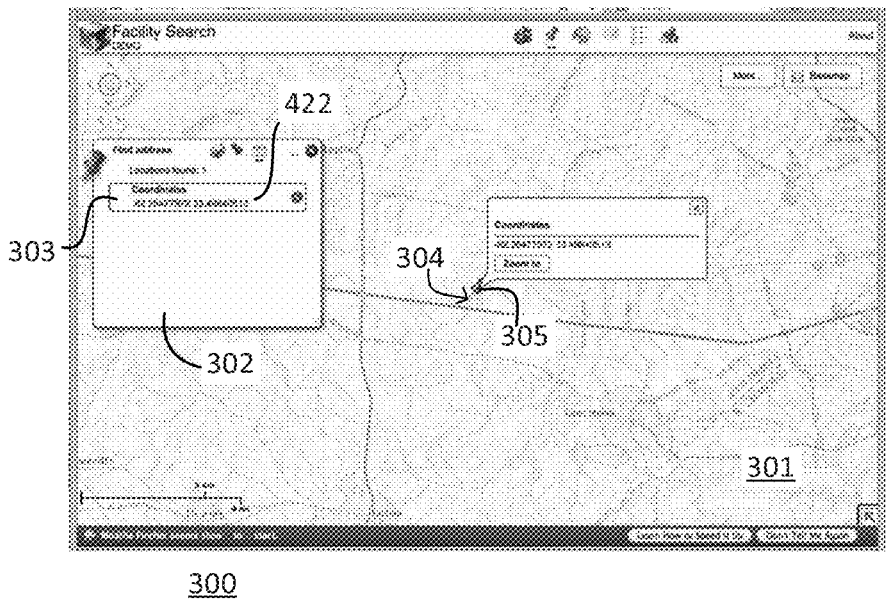
FIG. 11 illustrates a feature for indicating and displaying a map for a rural location.

In FIG. 11, user interface 300 has been trained to a different address indicated in window 303 of pop-up window 302 as described previously. Whereas the address indicated by the user in FIG. 3 was a street address corresponding to a city or other developed area, the location identified in window 303 of pop-up window 302 in FIG. 11 corresponds to a rural setting where, for example, there may be no conventional street and number address. In this example, the location may be indicated within window 303 by GPS coordinates 422 and GIS map 301 represents a map of a geographic area at the center of which is a pushpin 305 indicating a location 304.

Figure 12:
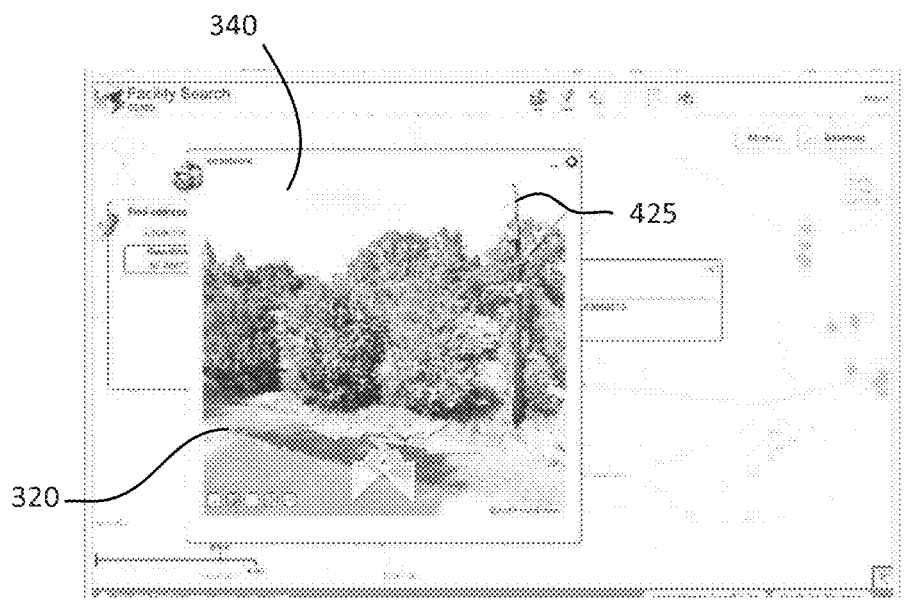
FIG. 12 illustrates an image of the rural location including an outside plant asset in the form of a utility pole.

FIG. 12 illustrates pop-up window 320 depicting an image 340 of location 304 (see FIG. 11) corresponding to the GPS coordinates 422 entered in window 303 of pop-up window 302 of FIG. 11. As can be seen in FIG. 12, the location depicted in pop-up window 320 appears to be located in a remote region and includes an outdoor plant asset in the form of a utility pole 425.

Figure 13:
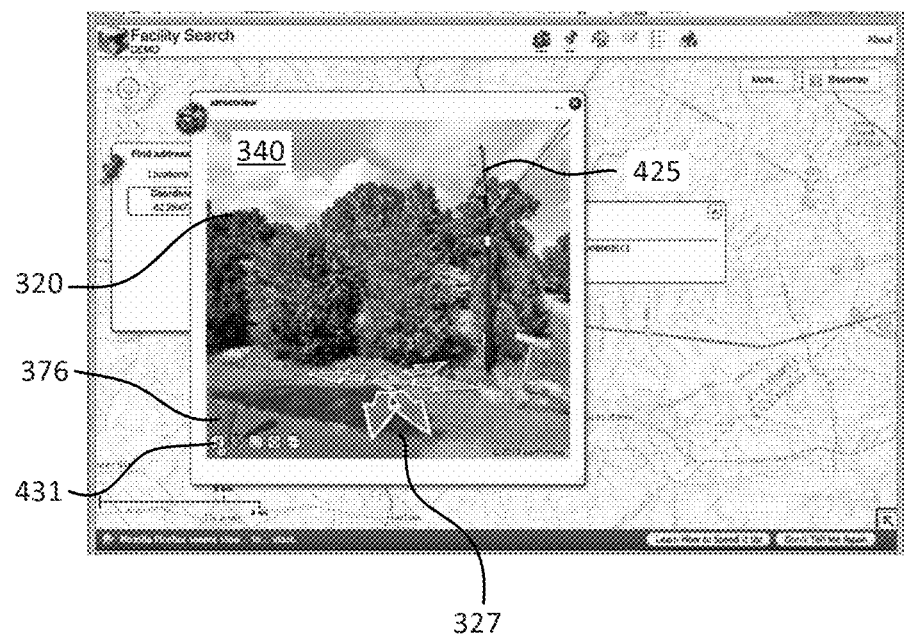
FIG. 13 illustrates a feature for interacting with a point cloud corresponding to the image of the rural location.
Figure 14:
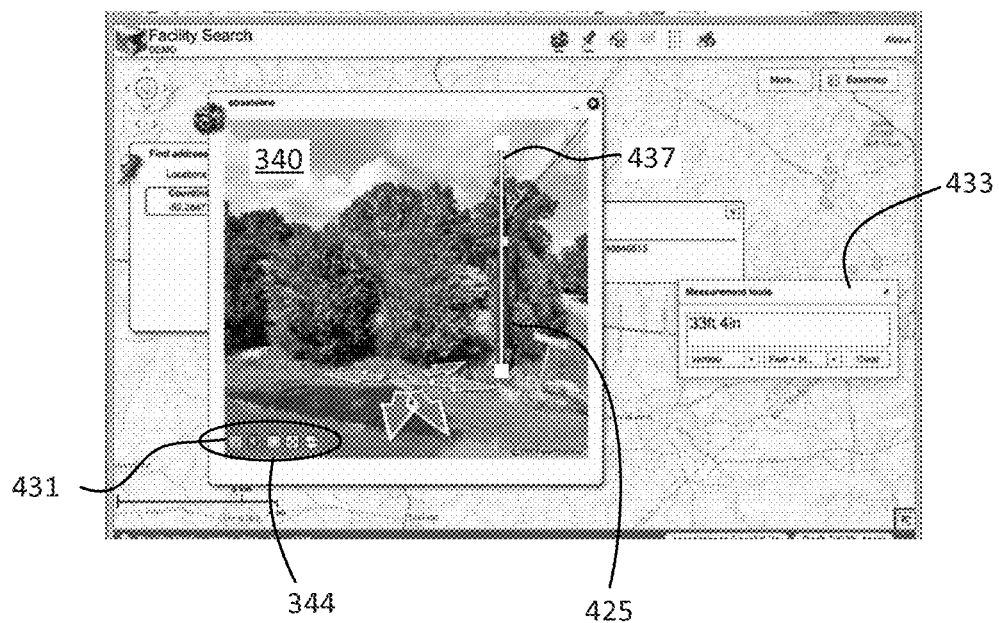
FIG. 14 illustrates a feature for using the point cloud data and the corresponding image to measure a dimension of the outside plant asset.

In FIG. 13, the user has selected a measurement feature icon 431 from functionality controls 344. User selection of measurement feature icon 431 generates a measurement pop up window and enables the user to trace a measurement line overlying image 340 and, more specifically, overlying the portion of the asset to be measured. In FIG. 14, a user has generated measurement line 437 tracing the length of utility pole 425 while the measurement pop up window 433 reports the length of the measurement line 437. FIG. 14 thus illustrates the use of accurate remote measurement capabilities made possible when point cloud data is associated with a corresponding image of an outside plant asset. In at least one embodiment, the measurement information is generated based upon the point cloud data underlying the image 340. For example, the measurement tool may identify the XY image coordinates of the endpoints of line 437, access the point cloud data associated with image 340 to determine 3D coordinates corresponding to the endpoints of line 437, and calculate a straight line distance between the two points. Because the point cloud data is based on highly accurate laser scanning methods in at least some embodiments, the measurement generated based off of the point cloud data is or may be accurate to within a few centimeters.

Figure 15:
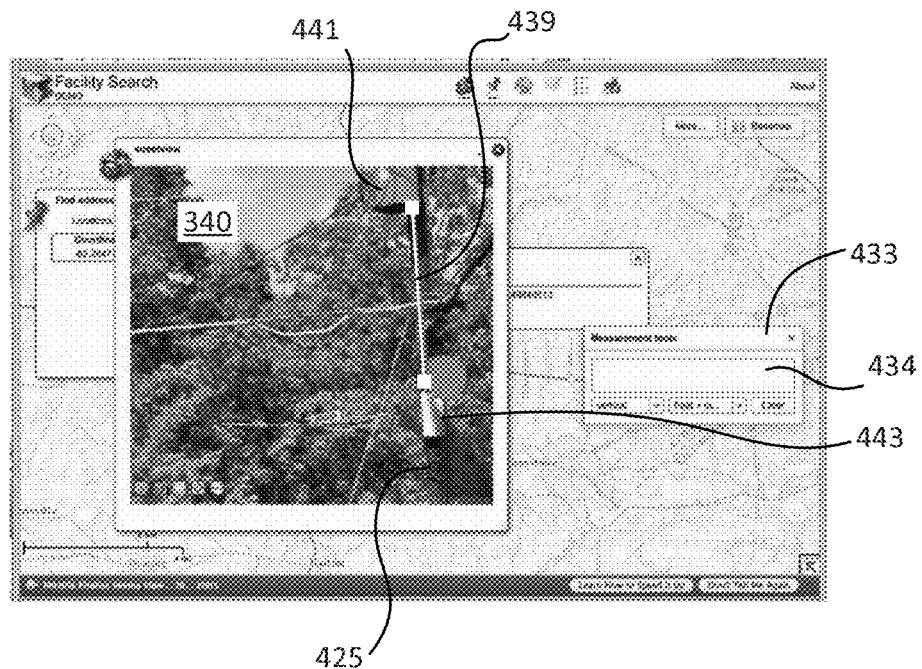
FIG. 15 illustrates a feature for using the point cloud data and the corresponding image to measure a second dimension of the outside plant asset.

FIG. 15 depicts a use of the measurement feature of FIG. 14 to measure the distance between two outside plant assets attached to utility pole 425, namely a transformer 441 and a cable box 443. In FIG. 15, the user has zoomed into the image 340 of FIG. 14 until the displacement between transformer 441 and cable box 443 is readily visible, enabling the user to draw a measurement line 439 extending between transformer 441 and a cable box 443 while measurement window 433 again displays the straight line distance between endpoints of the measurement line 439 as calculated from point cloud data corresponding to the endpoints of measurement line 439.

Figure 16:
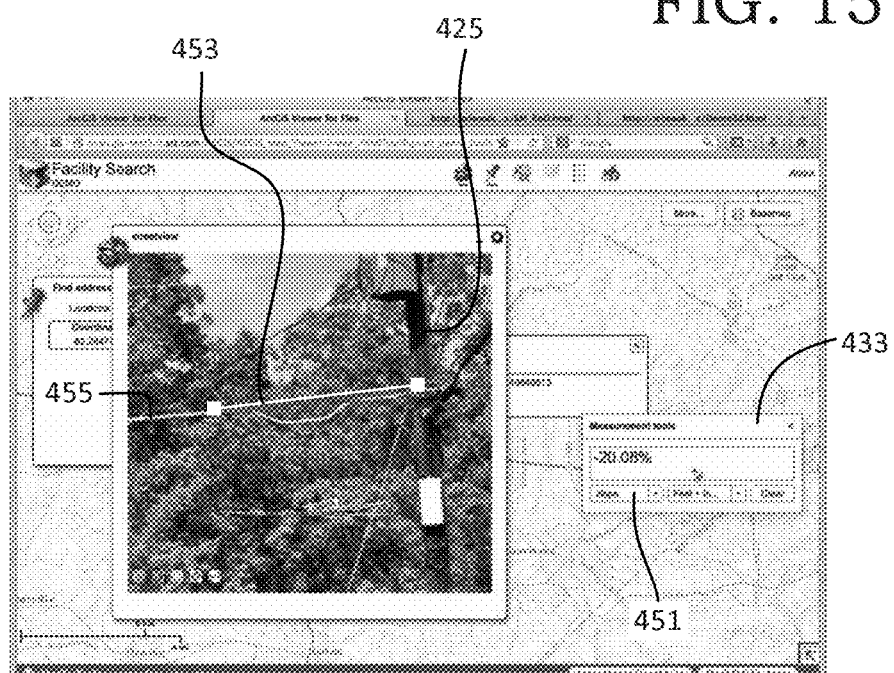
FIG. 16 illustrates a feature for using the point cloud data and the corresponding image to measure an angle of orientation or slope of a cable.

In some embodiments, measurement functionality includes features in addition to straight line distance measurements. FIG. 16 illustrates the use of measurement window 433 to measure the orientation or slope of one or more features depicted in image 340. In FIG. 16, a user has selected a slope feature 451 from measurement window 433 and drawn a measurement line 453 extending from utility pole 425 along a wire 455 attached to utility pole 425. The planning tool again determines XY image coordinates of the endpoints of line 453, retrieves or otherwise accesses point cloud data underlying image 340 to determine three dimensional coordinates of the endpoints of line 453, and calculates a slope of line 453. In at least one embodiment, the slope calculated represents the slope relative to a theoretical plane oriented parallel to the earth's surface such that the slope of line 453 would be the same or substantially the same regardless of the particular viewing angle presented in image 340. Measurement functionality supported by the planning tool may further include features to measure the length of curved or non-linear line segments, the measurement of the area enclosed by one or more user-drawn lines or shapes, and dimensions associated with outer measurable features.

Figure 17:
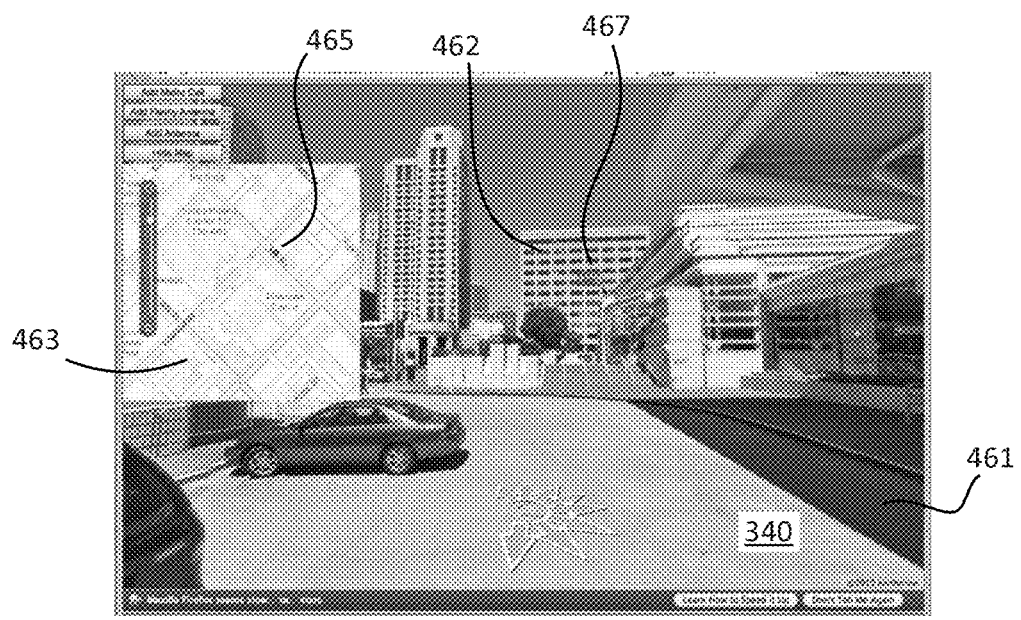
FIG. 17 illustrates a feature for adding an antenna and corresponding point cloud data to an image of a location.

Referring now to FIG. 17, an image 340 of a location is depicted in an interface 461 while a corresponding map or other 2D view of the location is illustrated in a picture in picture window 463. The picture in picture window 463 includes a colored dot 465 or other visible detectable overlay feature indicating an outdoor plant asset, a flashy antenna 467 in this example, that is visible within image 340 at its actual position, elevated from the ground and in contact with a building 462 in interface 461. Point cloud data associated with the image 340 illustrated in FIG. 17 thus includes a point cloud data object corresponding to flashy antenna 467, indicating the height or elevation of flashy antenna 467. At least one beneficial feature encompassed by the interface 461 depicted in FIG. 17 is the use of a 3D planning tool to provide third coordinate information to pre-existing assets stored or otherwise catalogued in a legacy planning tool database. Thus, for example, if flashy antenna 467 is recorded in a pre-existing asset database for a 2D planning tool the coordinates would convey, for example, the street address at which the antenna was located. However, embodiments of the 3D planning tool enable a user to access a streetview image of a location and a corresponding map that indicates one or more outside plant assets. The user may then select an outside plant asset indicated in the map and view any attribute information associated with the asset. The user may then append an appropriate icon to the appropriate location within the street view image and associate the streetview image icon with the corresponding asset such that the outside plant asset inherits all of the attributes of the asset from the 2D database and supplements the information with elevation information or other information suitable to indicate a position of the asset within a 3D coordinate space.

Figure 18:
FIG. 18 illustrates a feature for adding a virtual asset and a corresponding point cloud to an image of an existing location.

FIG. 18 illustrates a virtual asset feature in which a proposed asset is represented by a virtual object including virtual point cloud data. The virtual object may be appended to or otherwise associated with an image 340 of a location to provide a visualization of the proposed asset as located in the proposed location. In FIG. 18, a virtual asset is illustrated in the form of a virtual utility pole object 481. Virtual utility pole object 481 includes an icon representing an image of the propose asset and virtual point cloud data associated with the proposed asset. The virtual point cloud data indicates 3D coordinates of a virtual asset relative to a virtual origin. When a virtual asset is dragged and dropped or otherwise appended to an image 340 of a location, 3D coordinates may be assigned to the virtual origin of the virtual asset. After coordinates are associated with the origin of a virtual asset, the virtual assets remaining coordinates may be resolved based on the 3D coordinate of the asset's origin and the virtual point cloud data. Once a virtual asset is appended to an image 340 as a proposed asset, the proposed asset may be manipulated with the planning tool in the same manner as any other asset. Thus, for example, a user may perform a "walk around" of the proposed asset by zooming and panning the interface, measure the asset using the previously described measurement features, and so forth.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A network planning method, comprising:
accessing location information, wherein the location information includes:
an image of a location, wherein the image of the location depicts one or more existing objects at the location; and
point cloud data associated with the image of the location, wherein the point cloud data includes a primary point cloud for each of one or more of the existing objects, wherein the primary point cloud for an existing object indicates a shape and a three-dimensional position of a surface of the existing object generating a streetview user interface, wherein the streetview user interface includes the image of the location and a visual representation of one or more of the primary point clouds; and
performing a network planning function associated with the location, wherein the network planning function is selected from a group of network planning functions, comprising:
adding a virtual asset, wherein adding the virtual asset includes:
adding a primary point cloud and a secondary point cloud corresponding to the virtual asset to the point cloud data, wherein the secondary point cloud is indicative of a characteristic of the virtual asset; and
adding virtual elements to the streetview user interface, wherein the virtual elements include:
a virtual object representing the virtual asset; and
a visual representation of at least one of:
the primary point cloud corresponding to the virtual asset; and
the secondary point cloud corresponding to the virtual asset; and
wherein the virtual asset is a virtual metrocell transmitter for providing a hotspot and wherein the secondary point cloud for the virtual metrocell transmitter indicates a geographical extent of the hotspot.

2. The network planning method of claim 1, wherein generating the streetview user interface includes:
generating, with a network planning tool, a two dimensional user interface, wherein the two dimensional user interface includes a two dimensional representation of the location; and
selecting a streetview icon from the two dimensional user interface.

3. The network planning method of claim 2, wherein the two dimensional user interface includes a map of the location and indicates positions of at least some of the one or more existing objects.

4. The network planning method of claim 2, wherein one or more attributes assigned to one or more of the existing objects identify one or more existing objects corresponding to existing assets of an entity.

5. The network planning method of claim 4, wherein one or more of the existing assets are selected from a group of assets wherein the group of assets includes: a metrocell transmitter, a utility pole, a communication cable, and a switch box.

6. The network planning method of claim 4, wherein one or more of the attributes assigned to the existing objects distinguish virtual assets and existing assets.

7. The network planning method of claim 4, wherein one or more of the attributes assigned to the existing objects distinguish existing assets of the entity from existing assets of other entities.

8. The network planning method of claim 7, further comprising:
after an occurrence of an event, generating a second image of the location;
generating a second streetview user interface, wherein the second streetview user interface includes the second image of the location and the visual representation of the point cloud data; and
determining, from the second streetview user interface, whether the event affected any of the one or more existing assets of the entity.

9. The network planning method of claim 1, wherein the group of network planning functions includes:
measuring a linear dimension of one or more of the existing objects;
measuring an area of a surface of one or more of the existing objects; and
measuring an orientation angle of one or more of the existing objects.

10. The network planning method of claim 1, wherein the group of network planning functions includes modifying one or more of the existing assets.

11. The network planning method of claim 10, wherein modifying one or more of the existing assets includes modifying a position or location of one or more of the existing assets.

12. The network planning method of claim 10, wherein modifying one or more of the existing assets includes modifying a configuration of one or more of the existing assets.

13. The network planning method of claim 10, wherein modifying one or more of the existing assets includes replacing two dimensional location information associated with one or more of the existing assets with three dimensional information.

14. The network planning method of claim 1, wherein the visual representation of one or more of the primary point clouds appears in response to a cursor of the streetview user interface is moved over a portion of the image corresponding to one of the one or more existing objects.

15. A network planning system, comprising:
a processor; and
computer readable memory including processor executable instructions that, when executed by the processor cause the processor to perform operations comprising:
accessing location information, wherein the location information includes:
an image of a location, wherein the image of the location depicts one or more existing objects at the location; and
point cloud data associated with the image of the location, wherein the point cloud data includes a primary point cloud for each of one or more of the existing objects, wherein the primary point cloud for an existing object indicates a shape and a three-dimensional position of a surface of the existing object;
generating a streetview user interface, wherein the streetview user interface includes the image of the location and a visual representation of one or more of the primary point clouds; and
performing a network planning function associated with the location, wherein the network planning function is selected from a group of network planning functions, comprising:
adding a virtual asset, wherein adding the virtual asset includes:
adding a primary point cloud and a secondary point cloud corresponding to the virtual asset to the point cloud data, wherein the secondary point cloud is indicative of a characteristic of the virtual asset; and
adding virtual elements to the streetview user interface, wherein the virtual elements include:
a virtual object representing the virtual asset; and
a visual representation of at least one of:
the primary point cloud corresponding to the virtual asset; and
the secondary point cloud corresponding to the virtual asset; and
wherein the virtual asset is a virtual metrocell transmitter for providing a hotspot and wherein the secondary point cloud for the virtual metrocell transmitter indicates a geographical extent of the hotspot.

16. The network planning system of claim 15, wherein generating the streetview user interface includes:
generating, with a network planning tool, a two dimensional user interface, wherein the two dimensional user interface includes a two dimensional representation of the location; and
selecting a streetview icon from the two dimensional user interface.

17. The network planning system of claim 16, wherein the two dimensional user interface includes a map of the location and indicates positions of at least some of the one or more existing objects.

18. The network planning system of claim 16, wherein one or more attributes assigned to one or more of the existing objects identify one or more existing objects corresponding to existing assets of an entity.

19. A computer readable memory device including processor executable program instructions that, when executed by a processor, cause the processor to perform operations, comprising:
accessing location information, wherein the location information includes:
an image of a location, wherein the image of the location depicts one or more existing objects at the location; and
point cloud data associated with the image of the location, wherein the point cloud data includes a primary point cloud for each of one or more of the existing objects, wherein the primary point cloud for an existing object indicates a shape and a three-dimensional position of a surface of the existing object;
generating a streetview user interface, wherein the streetview user interface includes the image of the location and a visual representation of one or more of the primary point clouds; and
performing a network planning function associated with the location, wherein the network planning function is selected from a group of network planning functions, comprising:
adding a virtual asset, wherein adding the virtual asset includes:
adding a primary point cloud and a secondary point cloud corresponding to the virtual asset to the point cloud data, wherein the secondary point cloud is indicative of a characteristic of the virtual asset; and
adding virtual elements to the streetview user interface, wherein the virtual elements include:

a virtual object representing the virtual asset; and
a visual representation of at least one of:
  the primary point cloud corresponding to the virtual asset; and
  the secondary point cloud corresponding to the virtual asset; and
wherein the virtual asset is a virtual metrocell transmitter for providing a hotspot and wherein the secondary point cloud for the virtual metrocell transmitter indicates a geographical extent of the hotspot.

20. The computer readable memory device of claim 19, wherein the virtual asset is differentiated from the one or more existing assets are differentiated by color, wherein a color of the one or more existing assets differs from a color of the virtual asset.

\* \* \* \* \*